United States Patent [19]

Johnson et al.

[11] 3,970,391

[45] July 20, 1976

[54] DIRECTION DETERMINING METHOD AND APPARATUS

[75] Inventors: Philip M. Johnson, Windham; Richard M. Northrup, Nashua, both of N.H.

[73] Assignee: Sanders Associates, Inc., Nashua, N.H.

[22] Filed: July 29, 1974

[21] Appl. No.: 492,633

[52] U.S. Cl. ............................... 356/152; 356/4; 356/172; 33/286; 33/287
[51] Int. Cl.² .................................. G01B 11/26
[58] Field of Search ............... 356/4, 141, 152, 172; 33/286, 287

[56] References Cited
UNITED STATES PATENTS

| | | | |
|---|---|---|---|
| 3,046,681 | 7/1962 | Kutzler | 37/143 |
| 3,471,234 | 10/1969 | Studebaker | 356/3 |
| 3,588,249 | 6/1971 | Studebaker | 356/4 |
| 3,588,255 | 6/1971 | Alexander | 356/172 |
| 3,819,273 | 6/1974 | Unema et al. | 356/152 |

*Primary Examiner*—T.H. Tubbesing
*Assistant Examiner*—S. C. Buczinski
*Attorney, Agent, or Firm*—Louis Etlinger; Robert K. Tendler

[57] ABSTRACT

A direction finding system is disclosed in which a predetermined horizontal plane is established by the projection from one location of an image having illuminated and unilluminated portions corresponding to the predetermined horizontal plane. A receiver at a remote location detects the image at two spaced points amd produces an indication of the center of the transition zone between the illuminated and unilluminated portions of the projected image.

49 Claims, 17 Drawing Figures

DIRECTION DETERMINING METHOD AND APPARATUS

This invention relates to a direction determining system and more particularly to a method and apparatus for construction engineering and surveying in which a point on a predetermined plane is established at a remote location.

In construction engineering and surveying it is often necessary to establish a horizontal plane. The establishing of this plane establishes various elevations, for instance, for putting in foundations at the proper height, for positioning sidewalk forms, for measuring subgrade elevation, for positioning screeds accurately, to measure footing form height quickly, and for pouring walls and piers, etc. This has conventionally been done with a transit or level incorporating a telescope. When the telescope is leveled, the horizontal crosshair defines a horizontal plane at a given height above the ground. This horizontal plane is established at a remote location by aiming the leveled telescope at a leveling rod at the remote location and providing that the marker on the leveling rod be moved up and down until it is centered in the crosshairs of the telescope. The marker thus establishes a point on the predetermined plane from which other measurements may be made.

It will be appreciated that this is a time consuming process involving the use of two men who must be in communication with each other, with one man at the telescope and the other at the leveling rod. In an effort to eliminate a man and to improve the accuracy of the horizontal measurement, lasers have been employed to project a horizontal beam which is detected at a remote location to provide the appropriate elevation measurement. Both continuously rotating and servo tracking lasers are currently in use.

The most important problem which arises with laser leveling systems is locating the beam. The beam is typically pencil-thin and is only detectable at a remote location if the eye or a detector happens to be exactly at the same azimuth and elevation as the beam. In order to simplify beam detection, the laser is rotated to sweep out a 360° arc such that the beam describes a thin horizontal disk, which may be viewed at the correct elevation from any angle. It is then necessary to detect the elevation of the edge of the disk. This in itself is not easily done because of the narrow nature of the beam and because of the relatively low power levels required to maintain eye safety.

If it were permissible to make the laser powerful enough to project a beam visible on the leveling rod in broad daylight then by rapidly sweeping the beam, the elevation would be readily apparent by the brightly visible line formed during the sweep. However, since laser output must be limited for eye protection, electronic detectors are used. The locating problem then becomes one of properly positioning the detector so that the edge of the aforementioned disk is established. This is also time consuming since this edge may exist anywhere and is not easily found. To overcome this problem, elongated detectors or detector arrays are used. However, these detectors are expensive, cumbersome and are still limited in coverage. Moreover, the cost of the laser surveying system is oftentimes prohibitive due to the cost of the laser source and electronics. This has led to consideration of non-coherent light sources.

Prior to this time it has not been feasible to achieve the required accuracies with non-coherent light sources and conventional techniques. First, the receiver sensitivity, if an electronic receiver is used, is often times not capable of distinguishing a continuous light beam from background light at practical ranges in broad daylight. The distances overwhich construction engineering is accomplished typically range from 10 to 600 feet, and it is somewhat difficult to design a continuous non-coherent light system to work over this extended range.

In the prior art, some of the problems of using non-coherent light sources have been solved by the use of a xenon flashlamp and a particular coding system involving the use of masks or reticles. These systems are exemplified in U.S. Pat. Nos. 3,704,070, 3,662,180 and 3,799,675. In each of these systems a time sequence of patterns composed of various dark and light regions is projected into space. This is accomplished with two or more different masks or reticles. At a distant point the projected code appears as a series of two or more light flashes, such that as the angle between the object and the axis increase, the code changes in a predetermined manner.

In these systems, the first projected mask may be transparent which results in a reference pulse being transmitted. This reference pulse is necessary both for timing purposes and so that succeeding pulses can be compared to it and to provide a reference level for eliminating the so-called "scintillation" effect where atmospheric transmission between the projector and the receiver is not constant.

After the transparent mask is projected, the next masks are projected such that at a remote point the flash is either visible or not depending on the mask. A succession of masks thus results in a succession of pulses or absence of pulses at the remote location. The amplitudes of the received pulses are compared with the reference pulse and if it is above some specified fraction of the reference pulse amplitude it is determined to be a logic level 1 signal. Otherwise it is a logic level 0 signal.

The sequence of logic level 1 and 0 signals determines the angular displacement from the optical axis.

The present invention locates remote points differently by providing a xenon flashlamp with a single "knife edge" reticle to project a light/dark image with a straight boundary between the illuminated and non-illuminated regions. This boundary defines the desired horizontal plane and is easy to locate both because of the light flashes and because the horizontal plane can be easily established visually. Although the subject invention will be described as defining a horizontal plane it will be apparent that planes of any orientation may be established depending on the orientation of the knife edge.

In general, the subject system provides for the determination of a plane by the projection of an image from a projector to a sector of space and by the detection of this image at two spaced points. The size of the image can be quite large depending on the projection lens used which simplifies acquisition and detection of the image. The image consists of an illuminated and an unilluminated or shadowed area having a thin boundary between the illuminated and unilluminated areas. If the projector is level, the projected boundary is horizontal and provides an indication of a horizontal plane at the height of the projector above ground. With other projector orientations, other reference planes may be established.

A point on the horizontal plane is established by detecting the projected boundary between the illuminated and unilluminated regions at any location along the projection path. This may be done by observation of the projector from a remote point along the projection path and determining by eye the boundary of the light and dark regions by moving ones' head vertically across the boundary until the light appears to turn on and off with slight vertical movement. With this system no flashes appear anywhere below the projected horizontal plane, while flashes are highly visible anywhere above this plane. Thus with the subject system, a position "above" the horizontal is indicated by flashes and a position "below" the horizontal is indicated by an absence of flashes. The individual can therefore quickly locate the approximate position of the horizontal plane.

The subject system also simplifies the location problem by providing a broad beam which is wide as compared with the pencil-like beam from a stationary laser. Because of the width of the projected beam, the projector need not be rotated since the projected image may be easily detected at considerable angles from the optical axis of the projector. Thus only coarse aiming is required. In fact, 360° coverage can be obtained by use of a "fish eye" lens. In the case of the fish eye lens the knife edge reticle is circular.

Typically, while a stationary laser would only project a small image of, for instance, ½ inch at 600 feet, the subject apparatus projects an image which may typically be 30 feet high and 200 feet wide with the same horizontal location accuracy as a rotating laser system. Obviously such a large image is easier to locate than the beam from the swept laser because with the laser the eye must be exactly at the right elevation.

The boundary of the projected image can be determined with greater accuracy electronically, both because of the precision of the electronic equipment and because in reality the boundary between the illuminated and unilluminated regions is not sharp.

One of the more difficult problems when utilizing a non-coherent source is the projection of an infinitely sharp boundary line between the light and dark regions. When a light/dark image is projected it is not possible in practice to make the transition from the illuminated zone to the unilluminated zone discontinuous or instantaneous. Thus there exists a transition zone between the light and dark regions.

The present invention establishes the mid-point of the transition zone by the movement of a detector vertically across the transition zone. The midpoint of the transition zone is indicated and this accurately establishes a point on the horizontal plane.

In order to accomplish this accurate detection, the projector forms light and dark regions with a horizontal boundary as thin as possible. This pattern is projected at infinity and is detected at a predetermined point by detection apparatus mounted on a leveling rod. The detection apparatus includes two detectors mounted vertically one on top of the other and spaced apart such that the top detector resides in the illuminated region while the bottom detector moves across the transition zone. The top detector is called the reference detector with an output signal designated R and the bottom detector is called the signal detector with an output signal designated S. The xenon light source and reticle are oriented so as to project a horizontal boundary line between the light and dark regions. The signal detector is then moved up and down in a vertical direction until such time as the ratio of S/R is equal to some specified fraction indicating the center of the boundary, in this case: 0.5 plus or minus some allowed error $\Delta$. When a S/R ratio of 0.5 is indicated the height above ground of the particular horizontal plane established by the projected image is readily ascertained.

By measuring the ratio S/R it will be apparent that intensity variations, due to either the distance of the projector from the remote location or due to the effects of atmospheric absorption changes or xenon lamp output changes are completely eliminated because both S and R vary in the same manner. This is because the light paths for the reference beam and the signal beam are substantially the same with the light having been generated by a single source. Thus the subject surveying equipment can be utilized over a large range of distances without having to adjust the threshold of the detector and without having to compensate for atmospheric disturbances or light source level changes. While the subject invention will be described utilizing a non-coherent light source, coherent light sources may be utilized if desired. This system varies from the aforementioned non-coherent light systems in that here two detectors are utilized with the reference signal being instantaneously compared with the signal from the detector transiting the transition zone.

In addition to the surveying method and apparatus just described, certain problems arising in the implementation of such a system are also solved by the subject invention. In the design of a receiver system capable of detecting the light from the xenon source it became apparent that at close range the amplifiers in the receiver would saturate. It became important, therefore, to provide a piece of equipment which would be operable at distances closer than fifty feet and yet have sufficient sensitivity to be useable at distances of, for instance, 600 feet. The first solution to the problem of saturation is to decrease the apertures at the detectors as a function of the distance of the projector from the remote location. Because the subject system operates at a number of light levels it is not necessary that the apertures be exactly correlated with the distance of the projector from the remote location. It is only necessary that the apertures be sufficiently small at locations of, for instance, closer than 50 feet.

This solution, however, requires the placement and adjustment of apertures at the detectors. A solution to the saturation problem not involving the utilization of changing apertures, involves the detection taking place prior to saturation of any electronic components within the receiver. This requires the generation of a timing signal with each detected pulse so that the receiver is actuated on the rising leading edge of the received pulse prior to the time that the pulse amplitude rises to a point where receiver amplifiers are saturated. Thus all decisions as to whether or not the signal detector is located exactly on the horizontal plane are made prior to saturation and no new decisions are made until the next pulse. As will be described hereinafter, appropriate electronic circuits are provided for this purpose.

A further problem involved in processing the intense close-in light pulses is the problem of overshoot in which two or more pulses are sometimes produced for each received pulse. This would ordinarily cause the generation of two or more timing signals, one or more of which would occur because of overshoot. The subject invention includes a system for eliminating the effects of the overshoot by elongating the first pulse such that its duration exceeds the time when additional pulses would ordinarily be generated. This masks the effect of the additional pulses and only one timing signal is produced.

It is therefore an object of this invention to provide an improved surveying and construction method and apparatus involving the use of a non-coherent light source.

It is another object of this invention to provide a highly visible flashing marker beam from a single reticle used in projecting an image having illuminated and unilluminated zones detected at two spaced points, in which the intensity of the flashing image is utilized in establishing the center of the boundary between the illuminated and unilluminated zones.

It is a further object of this invention to project a single image in which a reference level is established at the same time as the center of the boundary is detected.

It is a further object of this invention to provide a receiver at the remote location which provides a reference signal and a detected signal, the ratio of which is utilized in establishing a predetermined plane.

It is yet another object of this invention to provide a direction determining system utilizing amplitude determining apparatus at a remote location and a projector including a non-coherent light source and a reticle in which only the intensity of the projected image is the factor by which the direction is indicated.

It is a still further object of this invention to provide a direction determining system in which pulses of energy are transmitted in a pattern to a sector of space, the pattern defining an illuminated and unilluminated region having a boundary therebetween in which a detector detects this boundary by detecting the intensity in the illuminated portion and the intensity at the boundary, a signal representing the intensity at the boundary being divided by a signal representing the value of the intensity of the illuminated portion, with the boundary being indicated by a predetermined ratio.

It is yet another object of this invention to provide a direction determining system including a projector and a receiver wherein the receiver includes means for eliminating the effects of saturation of receiver elements.

It is a yet still further object of this invention to provide an improved system for locating a point in a predetermined region established by the image projected by a light source and a reticle, with the point lying on the boundary of the illuminated and unilluminated portions of the image.

These and other objects of this invention will be better understood in connection with the following description in view of the appended drawings in which.

Figure 1:
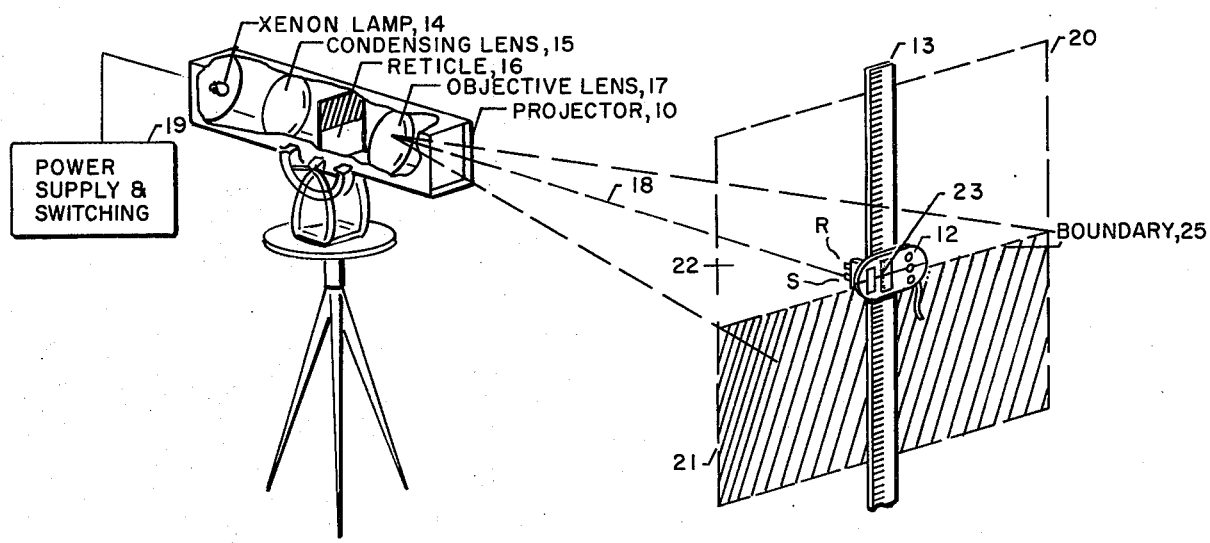
FIG. 1 is a diagramatic representation of the subject direction determining system including a projector and a receiver mounted on a leveling rod.

Referring now to FIG. 1, a system which establishes a point on a predetermined plane is illustrated which includes a projector 10 and a receiver 12 mounted for vertical displacement on a level rod 13. Rod 13 is appropriately marked with a scale measuring distance from the bottom of the rod. In one embodiment the projector includes a xenon flashlamp 14, a condensing lens 15, a reticle 16, and an objective lens 17 centered on an optical axis 18. A portable power supply and switching circuit 19 of conventional design is utilized to power xenon flashlamp 14. Reticle 16 interposed between the condensing lens and the objective lens in one embodiment is a mask having a opaque upper portion and a transparent lower portion, and a straight edge defining the boundary therebetween. This edge is aligned horizontally or at any other predetermined orientation by proper positioning of projector 10. It wll be appreciated that the edge can be of any convenient configuration to define any convenient boundary of the projected image. For purposes of description only, it will be assumed that the edge is straight although no limitation to straight edges is intended thereby.

With each flash of the flashlamp an image 20 is projected along optical axis 18. The image has an unilluminated or darkened area 21 and an illuminated area 22 separated by a boundary 25, with the boundary having the same orientation as the boundary between the opaque and transparent portions of the reticle 16. This establishes points along a predetermined plane in space.

Receiver 12 includes a reference detector which produces a reference signal R and a signal detector which produces a signal S. A horizontal line 23 marks the horizontal plane of the S detector and is used to locate the horizontal plane on the level rod. These detectors are oriented vertically such that the reference detector is immediately above the signal detector and spaced therefrom. At this point it should be noted that were the reticle to have its opaque portion below its transparent portion the positioning of the reference and signal detectors would be reversed.

Figure 2:
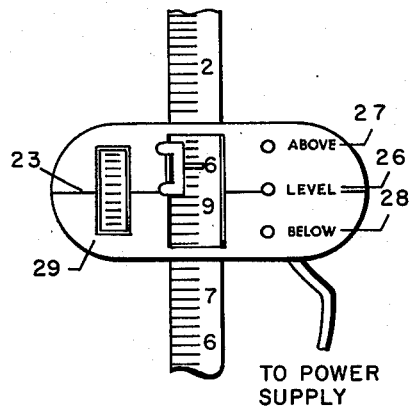
FIG. 2 is a front view of the receiver face plate illustrating the placement of the three indicator lights illustrated in FIG. 1.

In operation, the projector 10 is leveled so as to provide a projected horizontal boundary image and the receiver 12 is moved up and down the leveling rod until such time as the LEVEL light 26 of FIG. 2 is excited. If the receiver is above boundary 25 of FIG. 1 the ABOVE light 27 will be excited and if it is below boundary 25 the BELOW light 28 will be excited. For accurate centering of the receiver, in the embodiment shown, the reference detector is slowly moved across the boundary 25 until the LEVEL light is excited. This may be done by a conventional technique involving thumb screw 29, such that when the LEVEL light is excited the distance above ground is noted and a point on the predetermined horizontal plane is thus indicated. The bottom edge of the reticle may be provided with a colored band parallel to the knife edge so that the projected image has a top colored band, for instance, red. If the flashing light appears red, then the entire detecting apparatus is too high and is to be lowered for an appropriate measurement.

Figure 3:
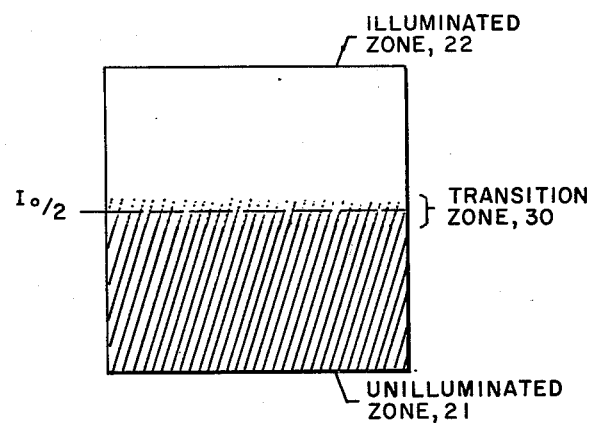
FIG. 3 is a diagramatic representation of the projected image illustrating the transition zone between the illuminated and unilluminated regions.

As mentioned hereinbefore, boundary 25 is not so sharp as to provide the required ± 1/16 of an inch error. Referring to FIG. 3 it will be appreciated that boundary 25 consists of a transition zone 30 with the center of the transition zone being $I_0/2$, where $I_0$ is the intensity of the illumination zone 22. Thus the boundary between the illuminated zone 22 and the unilluminated zone 21 is not infinitely sharp and it is the purpose of the subject detection system to locate the center or some other predetermined portion of the transiton zone to establish the requisite point on the horizontal plane established by the projected image.

Figure 4:
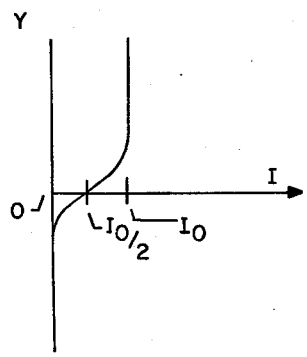
FIG. 4 is a graph of vertical distance as a function of intensity for the projected image illustrated in FIG. 3.

The intensity of the image across the transition zone is illustrated by the graph of FIG. 4. As will be appreciated the transition is from a zero or minimum background level to a maximum illuminated level $I_0$. It is assumed that the transition is smooth and linear such that the level $I_0/2$ in fact designates the horizontal plane and this in fact is a fairly good approximation, although some other ratio could be used.

As mentioned in connection with FIG. 1 the spacing between the reference detector and the signal detector is sufficient so that in the adjustment of the receiver upwardly and downwardly on the leveling rod the reference detector always remains in the illuminated portion. The signal detector therefore moves into and out of the transition zone and is used to detect the center of the transition zone. As mentioned before, due to the variation of the intensity of the received light either because of variation of the distance between the projector and the desired sector of space at which the horizontal is to be indicated, or because of either flashlamp variation or atmospheric attenuation variation, it is important that the measurement of the center of the transition zone be independent of the received intensity. In the subject system the signal from the signal detector is divided by a signal from the reference detector such that the center of the transition zone is indicated by a rato of ½ regardless of the intensity of the received signals. This fraction can be other than ½ if some other location within the transition zone is required, or if the transition is not linear. However, in the average, for each pulse of the flashlamp an indication of 0.5 indicates that the signal detector is positioned at exactly center of the transition zone. Thus the position of the signal detector at this time indicates a point on the horizontal plane established by the projected image.

Figure 5:
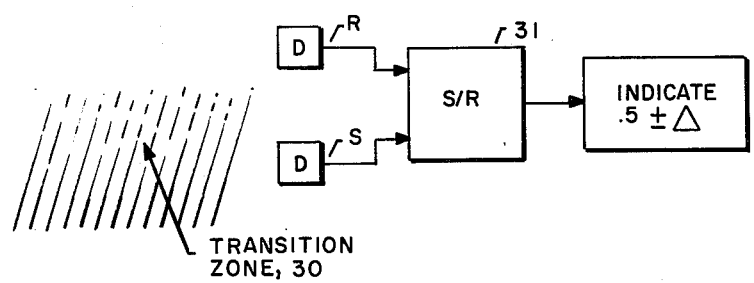
FIG. 5 is a block diagram of the receiver for the subject direction determining system.
Figure 6:
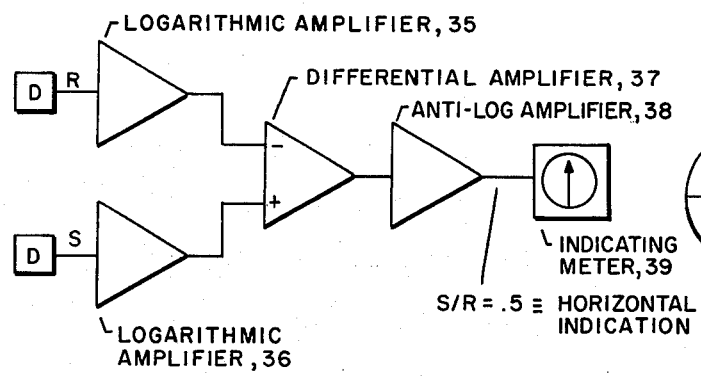
FIG. 6 is a block diagram illustrating the analog embodiment of the receiver of FIG. 5.
Figure 7:
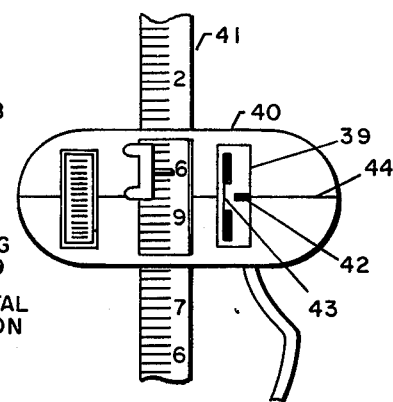
FIG. 7 is a front view of the receiver face for the analog embodiment.

As a practical matter centering may be indicated by a ratio 0.5 plus or minus Δ, with Δ being sufficiently small to permit leveling within 1/16 of an inch. This concept is illustrated in FIG. 5 in which both detectors are coupled to a dividing circuit 31, with the output thereof coupled to an indicating device 32. In its analog form, as illustrated in FIG. 6, both detectors may be coupled to logarithmic amplifiers 35 and 36 respectively. These amplifiers are in turn connected to the positive and negative inputs respectively of a differential amplifier 37. The output of differential amplifier 37 is coupled to an anti-log amplifier 38, the output of which is the output of the signal detector divided by the output of the reference detector. It will be appreciated that because of the use of logarithmic amplifiers, when the log of output signal R is subtracted from the log of the output signal S, this is equivalent to dividing S by R. When both the detectors are in the illuminated portion the ratio of S/R will equal 1. When both the detectors are in the unilluminated region, the ratio S/R will either be equal to 1 or will be indeterminate. In order to eliminate the problem of an indeterminate response a threshold is set. When R is below this threshold, the output indicates the proper direction of motion so that the detectors can be properly positioned. When the reference detector is in the illuminated portion and the signal detector is in the unilluminated region, then the ratio S/R will vary, with a 0.5 reading indicating a horizontal condition. This may be indicated on a suitable meter 39 as illustrated both in FIG. 6 and in FIG. 7, in which an analog equivalent system includes a receiver having a face plate 40 as illustrated with the receiver being mounted for vertical displacement on a level rod 41. When the meter needle 42 is within the limits illustrated by the notch 43, then the signal detector is sufficiently within the transition zone and within the required limits of the center of that zone. Horizontal line 44, it will be appreciated, lies in the same plane as the signal detector so that a point on the horizontal plane projected by the projector may be established and correlated directly with the scale on the level rod.

As alternative approach to the indication of a point on the required horizontal plane utilizes a three light system as described in connection with FIGS. 1 and 2. In this system, as illustrated by the graph in FIG. 8, the ABOVE light is on when the signal detector is above the horizontal detection zone 50 while the BELOW light is on when the signal detector is below the horizontal detection zone. The LEVEL light is on when the signal detector is positioned within the horizontal detection zone, it being appreciated that the reference detector is always for purposes of this discussion within the illuminated area. However, in practice it will be apparent that both the reference and signal detectors may be located totally within the illuminated zone at which point it is necessary for the ABOVE light to be on while it is also possible for the reference detector and the signal detector to be completely within the darkened region in which case it is important that the BELOW light be excited.

Figure 8:
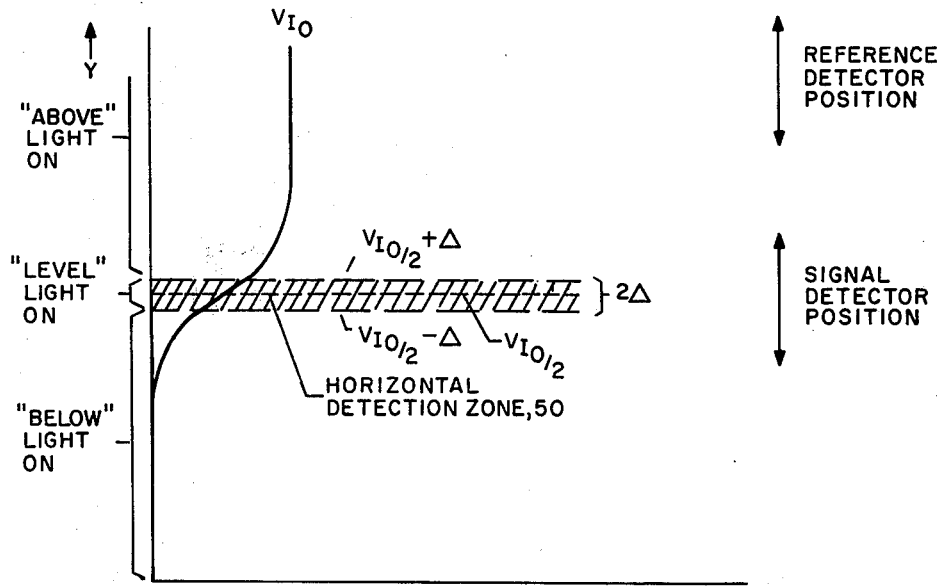
FIG. 8 is a graph of the output of a detector as a function of vertical position illustrating the criteria for the three light indicating embodiment.

The horizontal detection zone 50 is measured from $I_0/2$ which is ½ the intensity of the received light in the illuminated zone, e.g. $I_0$. Electronically, the intensity of the received light is translated into an output voltage, V, of a detector. Thus the horizontal detection zone, in this embodiment is symetrical about a $V_{I_0/2}$ position as illustrated in FIG. 8 and is removed therefrom by an amount $\pm\Delta$ such that the horizontal detection zone has a width of 2 $\Delta$.

Figure 9:
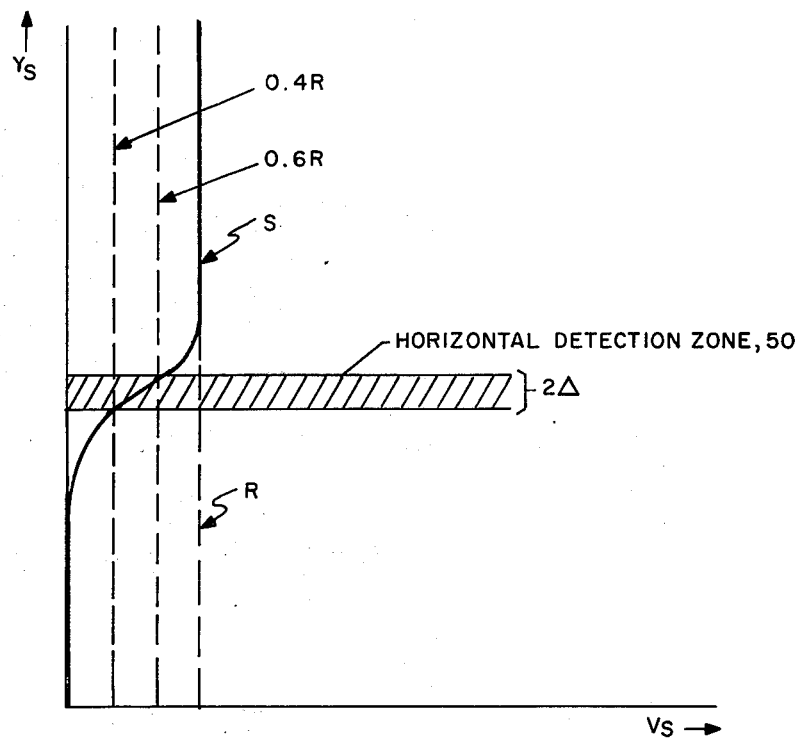
FIG. 9 is a graph of the output from the signal detector as a function of the position of the signal detector, indicating the derivation of the horizontal detection zone of FIG. 8.

The establishing of the horizontal detection zone involves the utilization of the output from the reference detector as illustrated in FIG. 9. In this graph the position of the signal detector is graphed against the output from this detector, with the dotted lines indicating the R, 0.6R and 0.4R levels when the reference detector is continuously in the illuminated zone. Here the reference detector and the signal detector have the same sensitivity such that R=S for both detectors in the illuminated zone. Thus, it will be appreciated that if both the signal detector and the reference detector are in the illuminated region then the output from each of these detectors can be made to be the same. As the receiver is moved downwardly the reference detector remains in the illuminated region while the signal detector transits from the illuminated region to the unilluminated region. This is illustrated by the heavy line of FIG. 9. Since the reference detector always remains in the illuminated region, it is possible to derive a signal equal to 0.4 times the output of the reference detector, e.g. 0.4R, and a signal 0,.6 times the output of the reference detector, e.g. 0.6R. It is therefore possible to compare the output from the signal detector with reference levels equal to 0.6R and 0.4R and thereby to establish the horizontal detection zone 50 as being the point of coincidence when the signal S from the signal detector reaches these various levels. As will be appreciated, the width of the horizontal detection zone is directly related to the fractions of the reference signal which are chosen such that the width of the horizontal detection zone 2 $\Delta$ may be changed by the selection of the reference voltage fraction. It has been found that with the xenon flashlamp described, 0.4R and 0.6R result in an error of less than 1/16 of an inch within the operating ranges described hereinbefore.

In practical application it is desirable to set a threshold above which the receiver will respond. Assuming this threshold level to be T and assuming the output from the reference detector to be R and the output from the signal detector to be S, then if $S < 0.4R < 0.6R$ the BELOW light is excited if $R > T$.

If $0.4R < S < 0.6R$ with $R > T$, then the LEVEL light is excited and the illumination of the BELOW light is inhibited.

If $S > 0.6R, R > T$, then the ABOVE light is excited and the LEVEL and BELOW lights are inhibited.

The inhibiting of the illumination of the BELOW and LEVEL lights simplifies the logic necessary to control the lights. This follows because as the amplitude of the signal from the pulse of light at the receiver increases, it first crosses a first fixed threshold at which time the BELOW light is excited. If the received signal then crosses the 0.4R level the LEVEL light is excited and the BELOW light is turned off. If the received signal then crosses the 0.6R level the ABOVE light is turned on and the LEVEL light is turned off. Thus after the receipt of a pulse, only one light will remain on.

Figure 10:
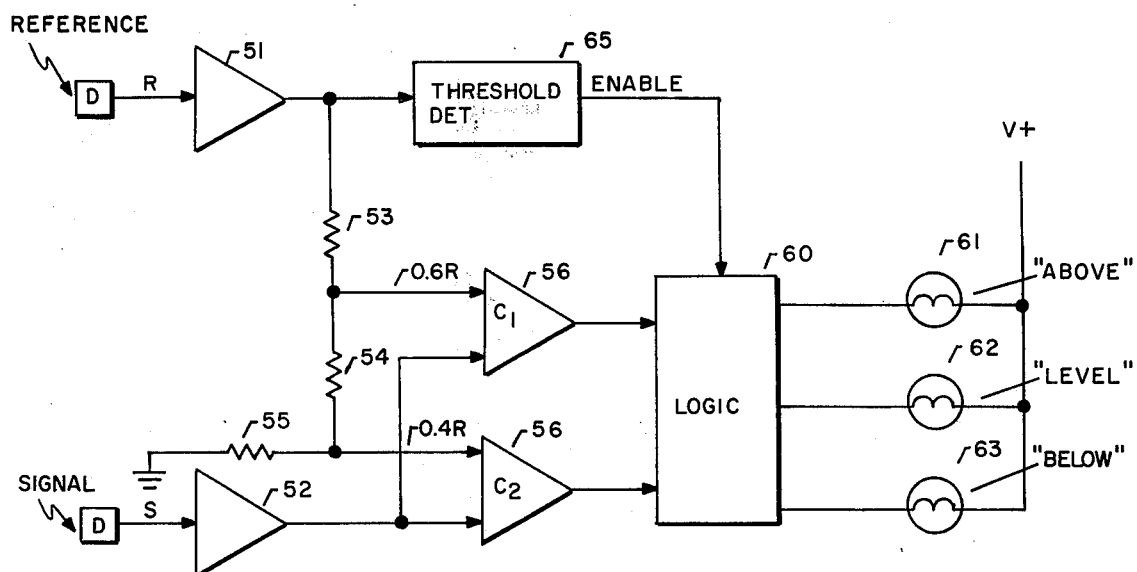
FIG. 10 is a block diagram of a circuit for detecting the projected image and for controlling the three light indicating system.

Referring to FIG. 10, a simple block diagram illustrates a circuit capable of performing the above functions. The reference and signal detectors are coupled to preamplifiers 51 and 52. The output signal from preamplifier 51 is developed across a resistor dividing network illustrated by the resistive elements 53, 54 and 55. The output signal S from the signal detector through preamplifier 52 is coupled to one input of each of two comparators 56, e.g. to one input of comparator $C_1$ and comparator $C_2$ respectively. The midpoint between resistive elements 53 and 54 is connected to the other input terminal of comparator $C_1$ while the midpoint between resistive elements 54 and 55 is connected to the other input of comparator $C_2$. The resistive elements are weighted such that comparator $C_1$ has a 0.6R reference signal and comparator $C_2$ has a 0.4R reference signal.

Figure 17:
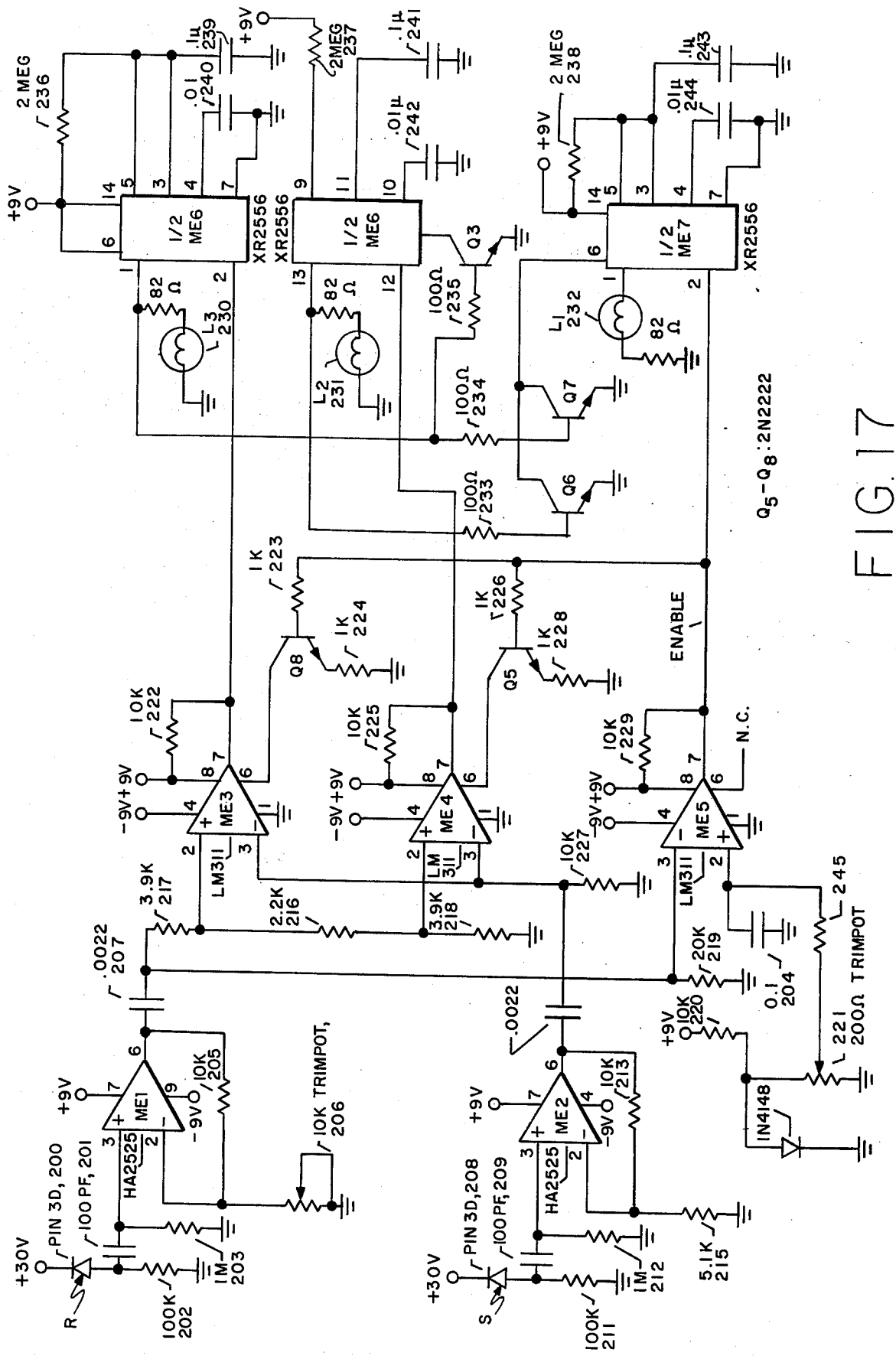
FIG. 17 is a detailed schematic diagram of a circuit in which saturation protection is not provided.

The outputs of comparators $C_1$ and $C_2$ are coupled to a logic circuit 60 which performs the above mentioned functions to excite ABOVE lamp 61, LEVEL lamp 62, and BELOW lamp 63. Moreover, the output from the reference detector through preamplifier 51 is coupled to a threshold detector 65 which enables energization of lamps 61, 62 or 63 when a received pulse exceeds a predetermined threshold. A corresponding detailed circuit is illustrated in FIG. 17.

The system illustrated generally in FIG. 10 is operative from distances of between 50 feet and 600 feet in one operative configuration. However, when the projector is closer to the remote location than 50 feet, saturation of the preamplifiers 51 and 52 may occur such that it is impossible to obtain accurate position indications. As mentioned hereinbefore, it is possible to cut down the aperture at the detectors whenever "close-in" surveying is desired. However, a completely automatic system requiring no manual adjustment for ranges below 10 feet to 600 feet is most desirable.

Figure 11:
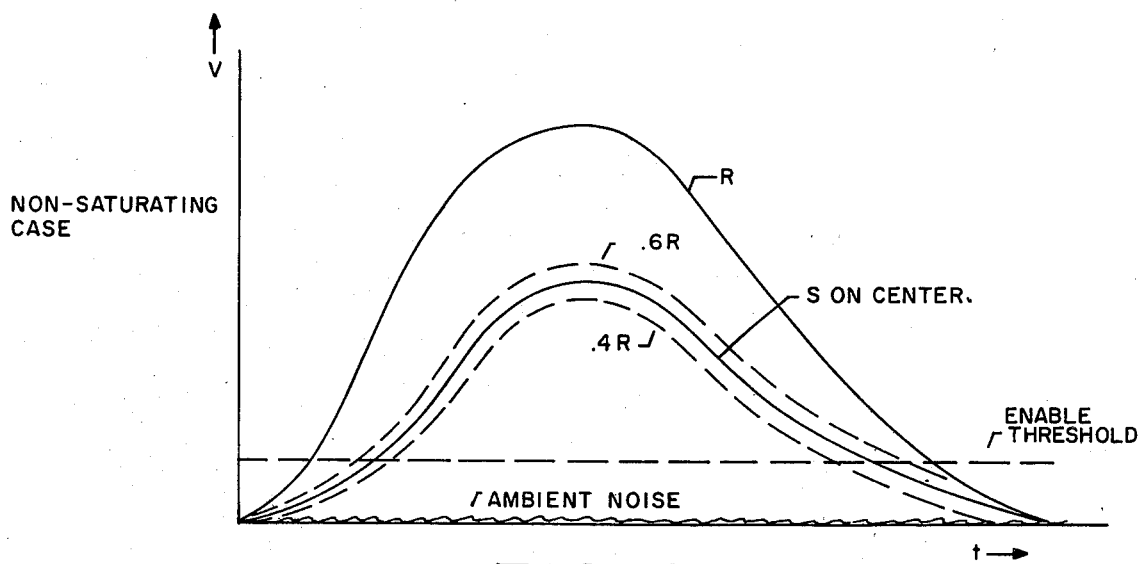
FIG. 11 is a graph indicating preamplifier output as a function of time for the non-saturating case.

Referring to FIG. 11 a graph indicating the outputs from the preamplifiers of FIG. 10 for a received pulse from the xenon flashlamp as a function of time is illustrated for the non-saturating case with the reference detector in the illuminated zone and the signal detector at the center of the transition zone. For convenience we assume that the gain of the preamplifiers is one such that their outputs are the R and S signals respectively. As can be seen, the amplified signal from the reference detector is R which builds up quickly and then decays over time. The 0.6R and 0.4R wave forms obviously follow this wave form. When the amplified signal from the signal detector, e.g. S in this case, is within the horizontal detection zone, the pulse envelope will lie intermediate the 0.6R and 0.4R envelopes as illustrated. Also illustrated is the enable threshold which is sufficiently above an ambient noise level to eliminate false readings.

Figure 12:
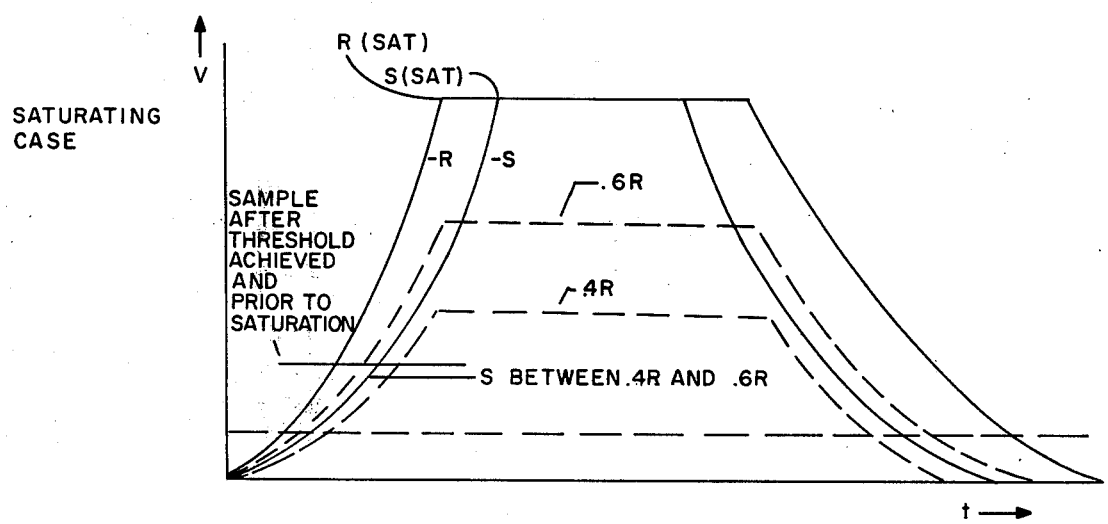
FIG. 12 is a graph indicating preamplifier output as a function of time for the saturating case, illustrating detection prior to saturation.

Referring now to FIG. 12, the outputs of both of the preamplifiers is illustrated for a pulse of incoming light which is of sufficient intensity to saturate these amplifiers. As can be seen, the signal from the reference detector rapidly rises to a point at which its preamplifier is saturated. At this point the output from this amplifier is at a constant high level. After the signal to the reference detector decays, this preamplifier unsaturates and follows the decay of the incoming pulse. Likewise, the output signal from the signal detector rises rapidly until its preamplifier is saturated at which point the output from both the preamplifier coupled to the reference detector and the preamplifier coupled to the signal detector are equal. It will thus be seen that at saturation the ratio S/R is not indicative of the horizontal condition.

The problem of the saturating preamplifiers is solved in the present invention by sampling the signals from the preamplifiers at a time after the threshold has been exceeded but prior to the time that saturation occurs, such that if the S signal is between the 0.6R and 0.4R levels at this time, the LEVEL light will be energized. Correspondingly, if at this time $S < 0.4R$ the BELOW light is energized, and if at this time $S > 0.6R$ the ABOVE light is energized.

In other words, the received signals are sampled on the rising portion of each received pulse and the indicators excited for a sufficiently long time to permit comfortable viewing. Thus, the logic system is inhibited prior to the time that the preamplifiers reach saturation. Saturation, therefore, has no effect on the system.

Figure 13:
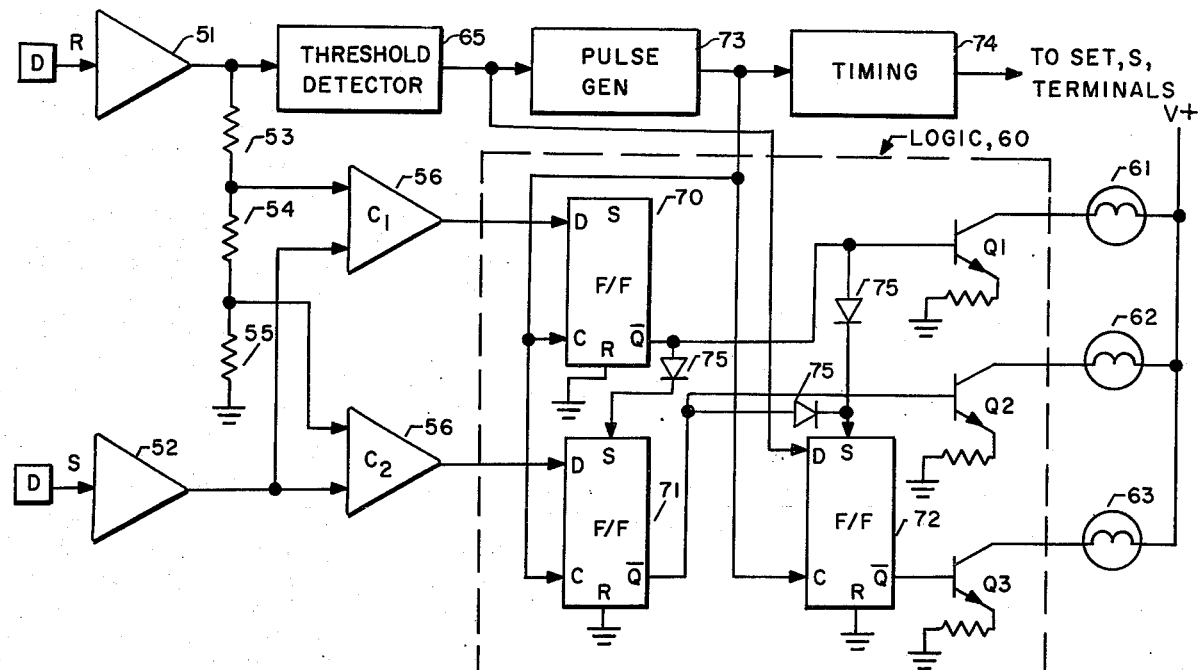
FIG. 13 is a block diagram illustrating a modification to the circuit illustrated in block form in FIG. 10, in which sampling prior to saturation is accomplished.

As illustrated in FIG. 13 this sampling function is accomplished quite easily by the use of D type flip flops 70, 71 and 72 which change state on the leading edge only of an applied clock pulse. In this embodiment, the $\overline{Q}$ output of the D flip flop goes to a logic level 1 only if the D input is zero. As can be seen, the circuit of FIG. 13 is a modification of the circuit illustrated in FIG. 10 wherein like elements carry like reference characters.

In order to generate clock pulses, the output of the threshold detector is first applied to a pulse generating circuit 73 of conventional design to provide a rising pulse when the output of the threshold detector 65 exceeds its predetermined threshold. The leading edge of this rising pulse enables flip flops 70, 71 and 72 for a brief instant of time after the threshold has been reached and prior to saturation. Information at the data input of the "D" flip flop is sampled only during this brief time period and is stored in the flip flop as a change of state until the flip flop is reset. Thus information on the data input line after the rising edge of the clock pulse is ignored. The flip flops are "reset" to an initial condition a pedetermined time after the detected signals exceed the predetermined threshold, this time defining the length of time that the indicating lights are activated. In one embodiment flip flops 70 and 71 are reset a predetermined time after a pulse from pulse generator 73 by a timing circuit 74 which in one embodiment is a one shot multivibrator having a time delay built in.

In one embodiment, the output of comparators $C_1$ and $C_2$ is a logic level 0 signal at the time that the S signal exceeds the reference signal thereto and will be a logic level 1 signal at all other times. Thus, if the signal detector is within the horizontal detection zone, the output from comparator $C_2$ will be at a logic level 0.

All the flip flops are "set", e.g. reset, such that their Q outputs are initially at a logic 0 level. When a logic 0 signal exists at the D input of a flip flop during the rising edge of the clock pulse, a positive pulse appears on the Q output terminal which signal is utilized to excite the appropriate lamp. By way of example, a logic level 0 signal from comparator $C_2$ existing during the leading edge of the clock pulse results in a change of state of flip flop 71 so that the Q output goes from 0 to 1 thereby to cause LEVEL lamp 62 to be excited.

In operation once the received pulse has risen to a point where the R signal exceeds the threshold level the BELOW lamp is lit. This lamp is inhibited should the S signal level rise above 0.4R. In this case the LEVEL lamp is lit and the BELOW lamp is inhibited. Should the S signal rise above 0.6R then the LEVEL lamp is inhibited and the ABOVE lamp is lit. This takes place rapidly so that it appears that only one lamp is lit for a given condition.

The inhibiting is accomplished by setting the flip flops as follows. The Q output of flip flop 70 is applied to the set input of flip flops 71 and 72 and the Q output of flip flop 71 is also coupled to the set input of flip flop 72 such that a pulse from flip flop 70 not only causes lamp 61 to be excited, but it also inhibits the output of flip flops 71 and 72 from going positive so that lamps 62 and 63 are inhibited. An output signal from flip flop 71 inhibits the output of flip flop 72 by resetting it to its set condition such that lamp 62 is inhibited when lamp 63 is lit. In this embodiment steering diodes 75 are used and are connected as illustrated.

Figure 14:
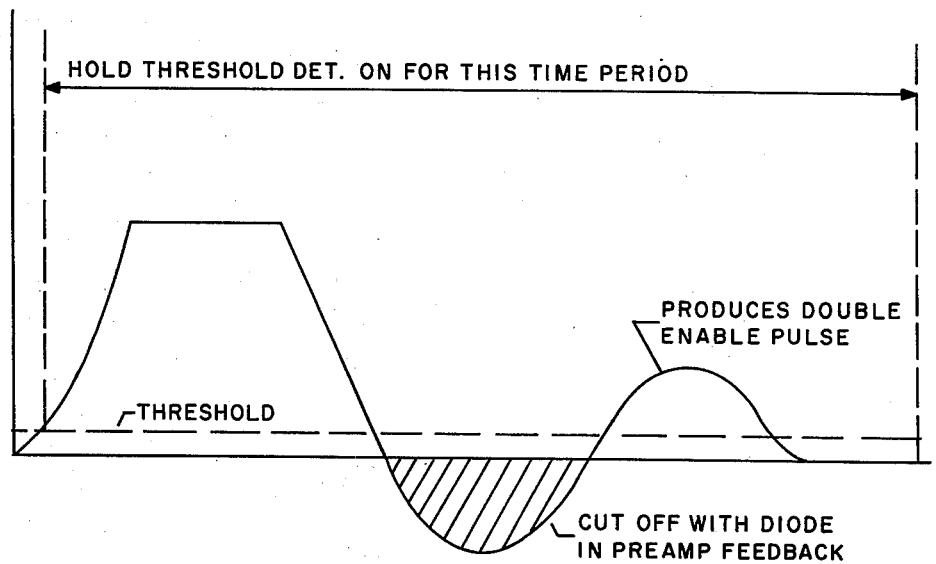
FIG. 14 is a graph illustrating the full preamplifier output vs time wave form for the saturating case showing the double pulse formation.
Figure 15:
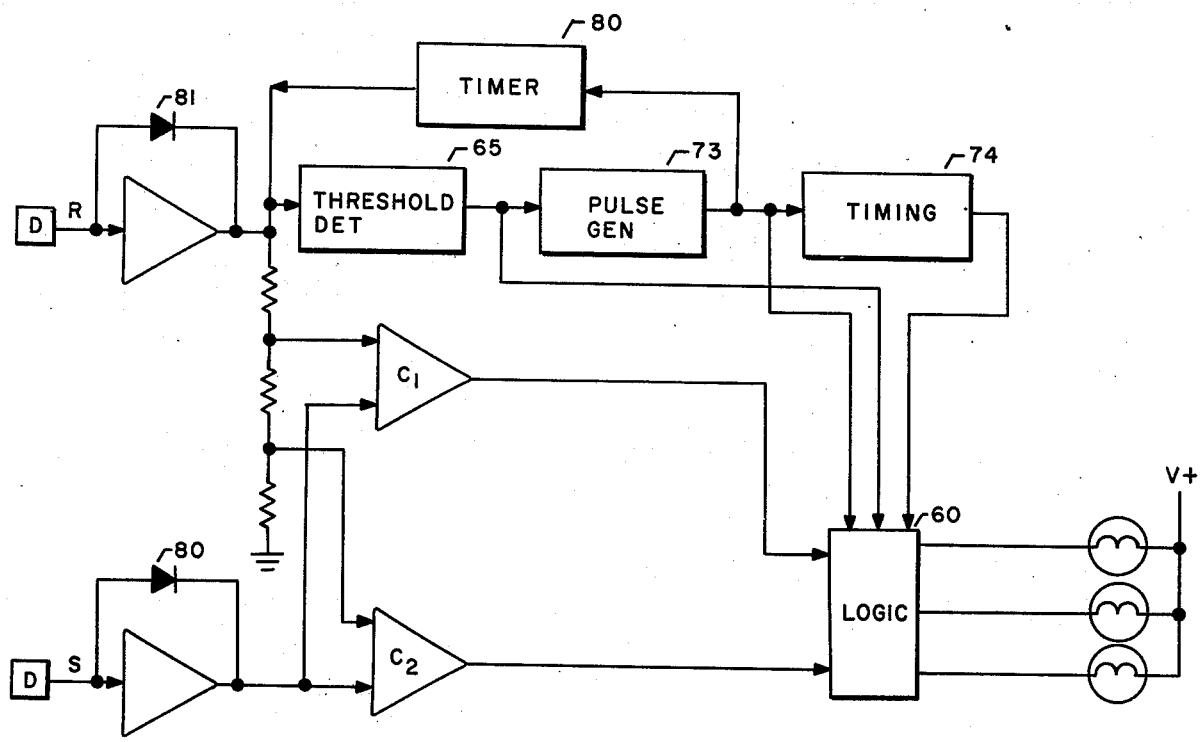
FIG. 15 is a block diagram illustrating a modification of the circuit shown in block form in FIG. 13 for eliminating the effect of the double pulse of FIG. 14.

While the FIG. 13 embodiment is designed to take care of the saturation problem, there is a further problem with high level input pulses. With high level input pulses (cf the waveform of FIG. 14) there is in fact a double positive pulse caused by overshoot or ringing of the preamplifier circuits. This double pulse would ordinarily cause double clock pulses to be applied to flip flops 70–72, thereby causing the system to respond during the decay oscillation which may result in false indications. As can be seen from the circuit diagram of FIG. 15, a further timing circuit 80 is provided which maintains a sufficiently high input signal on threshold detector 65 during the time period illustrated in FIG. 14. This time period starts when the input signal exceeds the present threshold and runs past the time at which the second positive pulse is expected. Thus pulse generator 73 sees only one output signal from the threshold detector per received flash and thus only one clock pulse is produced per incoming flash.

The negative going portion of the output signal from the preamplifiers is simply eliminated by placing a diode 81 in the feedback path of each of preamplifier which reduces the negative going component to zero by shunting it back to the input terminal of the preamplifier.

What has therefore been provided is a receiver circuit which responds to the incoming pulses to produce an indication of whether the signal detector is within the horizontal detection zone or outside of it, either above or below. The receiver can adequately handle incoming light pulses which saturates its preamplifiers and provides a unique logic circuit for simply accomplishing the sampling function. Moreover, the effect of overshoot of the preamplifiers is eliminated by providing as an input to the threshold detector a signal which maintains the output of the threshold detector in a predetermined state once the threshold detector has achieved this state. The output of the threshold detector maintains this predetermined state for a length of time sufficient to mask the effect of the double pulse produced during overshoot. A description of a detailed circuit to accomplish the above functions is now presented.

Figure 16:
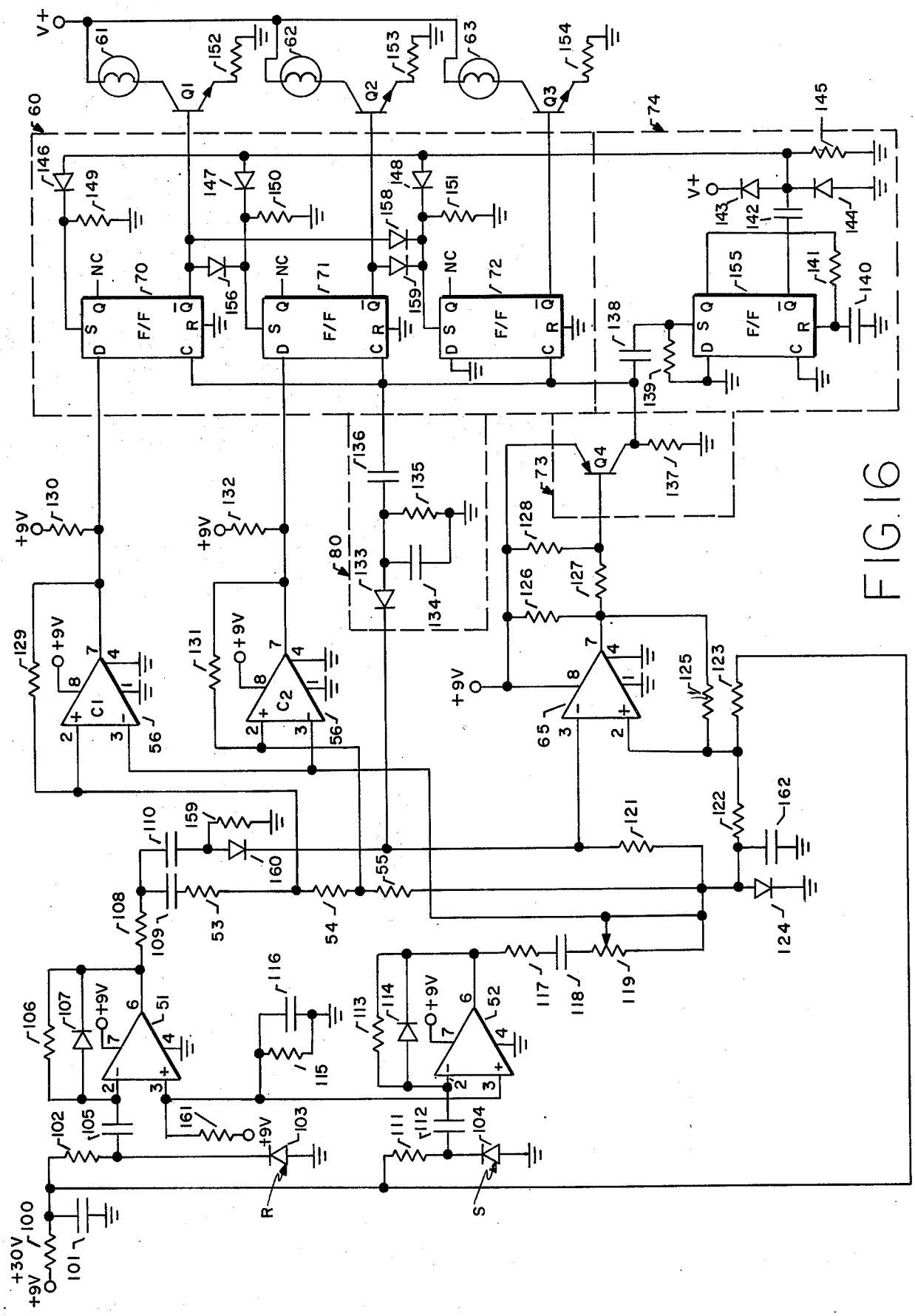
FIG. 16 is a detailed schematic diagram of the circuit illustrated in FIG. 15 in block form.

Referring now to FIG. 16, one operative circuit embodiment is now described. The components and their values are found in the following table.

COMPONENT TABLE

| | |
|---|---|
| 51 | HA 2525 Harris |
| 52 | HA 2525 Harris |
| 53 | 5.1K |
| 54 | 3.0K |
| 55 | 5.1K |
| 56 | LM 311 National |
| 61 | RL20 LEDS Litronix |

COMPONENT TABLE-continued

| | |
|---|---|
| 62 | RL20 LEDS Litronix |
| 63 | RL20 LEDS Litronix |
| 65 | LM311 National |
| 70, 71 | CD 4013 A RCA |
| 72, 155 | CD 4013 A RCA |
| 100 | 1K |
| 101 | 39 Mfd 10V |
| 102 | 10K |
| 103 | PIN-3D United Detector Technology |
| 104 | PIN-3D United Detector Technology |
| 105 | .01 |
| 106 | 1 Meg |
| 107 | IN 4148 |
| 108 | 2.2K |
| 109 | .01 |
| 110 | .01 |
| 111 | 10K |
| 112 | .01 |
| 113 | 1Meg |
| 114 | IN 4148 |
| 115 | 10K |
| 116 | .01 |
| 117 | 1K |
| 118 | .01 |
| 119 | 10K |
| 121 | 20K |
| 122 | 100 |
| 123 | 10K |
| 124 | IN 4148 |
| 125 | 100K |
| 126 | 10K |
| 127 | 2.2K |
| 128 | 10K |
| 129 | 4Meg |
| 130 | 10K |
| 131 | 3Meg |
| 132 | 10K |
| 133 | IN 4148 |
| 134 | 1000pfd |
| 135 | 1Meg |
| 136 | .01 |
| 137 | 10K |
| 138 | 100pfd |
| 139 | 1Meg |
| 140 | 0.1 |
| 141 | 2Mcg |
| 142 | 100pfd |
| 143 | IN 4148 |
| 144 | IN 4148 |
| 145 | 1Meg |
| 146 | IN 4148 |
| 147 | IN 4148 |
| 148 | IN 4148 |
| 149 | 1Meg |
| 150 | 1Meg |
| 151 | 1Meg |
| 152 | 82 |
| 153 | 82 |
| 154 | 82 |
| 156 | IN 4148 |
| 157 | IN 4148 |
| 158 | IN 4148 |
| 159 | 1Meg |
| 160 | IN 4148 |
| 161 | 10K |
| 162 | .1mfd |

| | |
|---|---|
| Q1 | 2N2222 |
| Q2 | 2N2222 |
| Q3 | 2N2222 |
| Q4 | 2N2907 |

As described hereinbefore, the same signal from the xenon flashlamp is detected in this case by diodes 103 and 104. The signal from diode 103 is utilized as the reference signal R while the signal from diode 104 is used as signal S. These two signals are coupled respectively to preamplifiers 51 and 52 which produce signals proportional to R and S. The absolute magnitude of these signals is unimportant because it is their ratio which is detected. The signal from preamplifier 51 is delivered to terminal 3 of a comparator which functions as threshold detector 65. The other terminal of the threshold detector is coupled to a fixed reference voltage source such that when the signal at diode 103 exceeds this predetermined threshold a negative going pulse is generated at output terminal 7 of threshold detector 65. This pulse generally would last approximately 20 microseconds and is inverted at Q4 to provide a timing or clock pulse delivered to each of the flip flops 70, 71 and 72. The clocking signal is also fed to timing circuit 80 comprising an RC network having elements 134, 135 and 136 providing the timing delay. The signal from the timing circuit is applied to input terminal 3 of the threshold detector 65 to maintain the threshold detector output signal low for approximately 1 millisecond, thereby to prevent a double negative going pulse from being generated at output terminal 7 of threshold detector 65 and thereby to prevent a double positive timing pulse from being generated at the collector of transistor Q4.

Upon the reaching of the threshold level by the signal from preamplifier 51 and, on the leading edge, e.g. the positive going edge of the clocking signal from transistor Q4, flip flop 72 turns transistor Q3 ON, which momentarily excites the lower lamp 63. Thereafter, when the signal from preamplifier 52 is applied to terminal 3 of each comparator 56 and reaches the first or lower reference level, (as determined by the voltage at terminal 2 of comparator $C_2$) then when flip flop 71 is clocked, transistor Q2 is turned ON, thereby to apply power to lamp 62. The signal from the $\overline{Q}$ output terminal of flip flop 71 inhibits the excitation of lamp 63 by setting flip flop 72 thereby removing the base bias on transistor Q3 for rendering it non-conductive.

Should the signal from preamplifier 52 rise above that level established at terminal 2 of comparator $C_1$ then flip flop 70 provides a signal at its $\overline{Q}$ output thereby to render transistor Q1 conductive for the excitation of lamp 61. At this time lamp 62 is extinguished via a pulse through diode 156 thereby to set flip flop 71 for removing the $\overline{Q}$ output which renders transistor Q2 non-conductive. At the same time a $\overline{Q}$ output from flip flop 70 sets flip flop 72 if it has not already been set, thereby to extinguish lamp 63 in the aforementioned fashion. This sequence provides that as the signal from preamplifier 51 exceeds the threshold level Q3 first turns on to excite lamp 63. Then Q2 turns ON to excite lamp 62 if the signal from preamplifier 52 exceeds the first comparison threshold and then Q1 turns ON to excite lamp 61 should the signal from the preamplifier 52 exceed a second comparison threshold. Thus the lamp which finally remains ON indicates the position of the signal detector relative to the aforementioned transition zone.

It will be appreciated that whatever lamp is to be lit, it must remain ON for a time long enough to be visible to the naked eye. This is accomplished by flip flop 155 which in essence is a 1 shot multi-vibrator having a timing constant determined by capacitor 140 and resistor 141. It is the function of this unit to provide a set signal at a predetermined time after the clocking signal has developed across capacitor 138. This set signal is delivered to flip flops 70, 71 and 72 a predetermined time after the clocking signal such that the lamp finally excited will remain energized until such time as its corresponding flip flop is set. It will be appreciated that by using the Q output of the flip flops and by grounding the reset terminal thereof, the set signal is in effect a resetting signal which resets the entire system a predetermined time after the arrival of a pulse above the predetermined threshold. Thus the entire system is reset between successive pulses from the xenon flashlamp.

The fixed threshold level for the threshold detector is set by resistor network 122 and 123, while the comparison circuits $C_1$ and $C_2$ have a threshold set by the voltage appearing across the resistor network comprising resistors 53, 54 and 55. The threshold for comparators $C_1$ and $C_2$ is an adaptive threshold depending on the amplitude of the signal from photodiode 103.

The aforementioned ringing is inhibited by diodes 107 and 114 in the feedback loops of preamplifiers 51 and 52 respectively. This eliminates the negative going ringing pulse.

What has therefore been provided is an adaptive and sensitive surveying system in which a point on a reference plane is easily established by establishing a predetermined point in the transition zone between the illuminated and unilluminated regions of the image projected.

It will be appreciated that this plane can be rotated in any direction such that direction sensing is possible with respect to any predetermined reference plane. Moreover, the boundary between the illuminated and unilluminated portions need not be a straight line and this system is in effect a system for locating a point on any boundary between illuminated and unilluminated portions of a projected image. The application of this surveying device is widespread and may be utilized with either coherent or non-coherent light sources in such diverse fields as the leveling of railroad tracks as well as the optical alignment of heavy machinery, and tire roundness testing where the tire forms the reticle. It will be apparent that the sensitivity of the detector is in part due to its adaptive threshold technique which in essence upgrades the accuracy of systems using a non-coherent light source to the accuracy obtainable heretofore only by systems using coherent light sources. Moreover, because the beam from the projector may be relatively wide it is not necessary to station a man at the leveling rod when coarse aiming of the projector is done. Additionally the horizontal plane is quickly found because the "above" plane and "below" plane positions are indicated.

Although preferred embodiments of the invention have been described in considerable detail for illustrative purposes, many modifications will occur to those skilled in the art. It is therefore desired that the protection afforded by Letters Patent be limited only by the true scope of the appended claims.

What is claimed is:

1. Apparatus for establishing at a first location a plane having a predetermined orientation and position and for locating a reference point on said plane at a second location comprising:
    means for projecting to said second location an image having an illuminated and unilluminated portion separated by a boundary region which includes said reference point;
    means at said second location for detecting said image at two detection points to produce first and second signals, each having an amplitude corresponding to the intensity of the image at a corresponding detection point; and
    means for establishing said reference point from a predetermined comparison of said amplitudes, including means for indicating said reference point by the position of one of said two detection points when said predetermined comparison between the amplitudes of said two signals exists.

2. The apparatus of claim 1 wherein said projection means includes a source of non-coherent light.

3. The apparatus of claim 2 wherein said non-coherent light source produces pulses of light.

4. The apparatus of claim 1 wherein said detecting means includes two light sensitive detectors, in spaced apart relationship, one of said detectors being a reference detector and the other of said detectors being a signal detector, wherein said establishing means includes means for dividing the output of said signal detector by the output of said reference detector, and wherein said indicating means includes means for indicating when the quotient at the output of said dividing means is within a predetermined range between 1 and 0.

5. The apparatus of claim 4, wherein said indicating means includes means for indicating when said quotient is 0.5 ± some predetermined error.

6. The apparatus of claim 4 wherein said dividing means includes means for establishing a pair of reference signals having amplitudes equal respectively to two different fractions of the amplitude of the signal from said reference detector, means for comparing the amplitude of the first of said reference signals with the amplitude of the output signal from said signal detector, and means for comparing the amplitude of the second of said reference signals with the amplitude of the output signal from said signal detector, a signal level from said signal detector lying between the amplitudes established by said reference signals indicating that said signal detector is positioned within a predetermined range of the center of said boundary region.

7. The apparatus of claim 3 wherein said establishing means includes electronic components which saturate at predetermined input signal levels, and means for sampling the output of said detection means only during the rising portion of a received pulse of light prior to saturation of any of said saturable electronic components.

8. The apparatus of claim 7 wherein said sampling means includes means for generating a timing signal whenever a received light pulse exceeds a predetermined threshold and means for eliminating the generation of timing signals caused by additional pulses generated as a result of the receipt of an intense pulse of light.

9. The apparatus of claim 8 wherein said eliminating means includes means for extending the duration of said timing signal to a time exceeding that of expected additional pulses.

10. The apparatus of claim 3 wherein said indicating means includes means for indicating when said signal detector is within a detection zone centered on the center of said boundary region.

11. The apparatus of claim 10 wherein said indicating means further includes means for indicating when said signal detector is to one side of said detection zone and means for indicating when said signal detector is to the other side of said detection zone.

12. The apparatus of claim 11 wherein said means for indicating includes light emitting means energized to indicate the position of said signal detector relative to said detection zone.

13. The apparatus of claim 12 wherein said establishing means includes means for energizing the light emitting means indicating that said signal detector is to said one side if the amplitude of the output signal from said reference detector exceeds a first predetermined threshold, for de-energizing the light emitting means indicating that said signal detector is to said one side and for energizing the light emitting means indicating when said signal detector is in said detection zone if the amplitude of the output signal from said signal detector exceeds a second threshold, and for de-energizing both of said last mentioned light emitting means and for energizing the light emitting means indicating that said signal detector is to said other side when the amplitude of the output signal from said signal detector exceeds a third predetermined threshold.

14. The apparatus of claim 13 wherein said second and third thresholds are adaptive thresholds derived from the level of the output signal from said reference detector.

15. The apparatus of claim 14 wherein said second and third thresholds are derived from signals which are predetermined fractions of the output signal from said reference detector.

16. In a system for establising at a first location a plane having a predetermined orientation and position and for indicating a reference point on said plane at a second location, said apparatus including means for projecting to said second location an image having an illuminated and unilluminated portion separated by a boundary region of finite width which includes said reference point;
   means at said second location for detecting the image at two spaced detection points to produce first and second signals, each having an amplitude corresponding to the intensity of the image at a corresponding detection point and for establishing said reference point from a predetermined comparison of said amplitudes, including means for indicating said reference point by the position of one of said detection points when a predetermined comparison between the amplitudes of said two signals exists.

17. The apparatus of claim 16 wherein said projection means includes a source of non-coherent light.

18. The apparatus of claim 17 wherein said non-coherent light source produces pulses of light.

19. The apparatus of claim 17 wherein said detecting means includes two light sensitive detectors, in spaced apart relationship, one of said detectors being a reference detector and the other of said detectors being a signal detector, wherein said establishing means includes means for dividing the output of said other detector by said one detector, and wherein said indicating means includes means for indicating when the quotient at the output of said dividing means is within a predetermined limit of ½.

20. The apparatus of claim 19, wherein said indicating means includes means for indicating when said quotient is 0.5 ± some predetermined error.

21. The apparatus of claim 19 wherein said dividing means includes means for establishing a pair of reference signals equal respectively to two different fractions of the signal from said reference detector, means for comparing the first of said reference signals with the output signal from said signal detector, and means for comparing the second of said reference signals with the output of said signal detector, a signal level from said signal detector lying between said reference signals indicating that said signal detector is positioned within said predetermined portion of said boundary region.

22. The apparatus of claim 18 wherein said establishing means includes electronic components which saturate at predetermined input signal levels, and wherein said means for establishing the position of said center includes means for sampling the output of said detection means only during the rising portion of a received pulse of light prior to saturation of any of said saturable components.

23. The apparatus of claim 22 wherein said sampling means includes means for generating a timing signal whenever a received light pulse exceeds a predetermined threshold and means for eliminating the generation of timing signals responsive to additional pulses generated as a result of the receipt of an intense pulse of light.

24. The apparatus of claim 22 wherein said eliminating means includes means for extending the duration of said timing signal for a time exceeding that of expected additional pulses.

25. The apparatus of claim 18 wherein said indicating means includes means for indicating when said signal detector is within a detection zone centered on the center of said boundary region.

26. The apparatus of claim 24 wherein said indicating means further includes means for indicating when said signal detector is to one side of said detection zone and means for indicating when said signal detector is to the other side of said detection zone.

27. The apparatus of claim 25 wherein said means for indicating includes light emitting means energized to indicate the position of said signal detector relative to said detection zone.

28. The apparatus of claim 26 wherein said establishing means includes means for energizing the light emitting means indicating that said signal detector is to said one side when the output of said reference detector first exceeds a first predetermined threshold, for de-energizing the light emitting means indicating when said signal detector is in said detection zone when the output of said signal detector exceeds a second threshold, and for de-energizing both of said last mentioned light emitting means and for energizing the light emitting means indicating that said signal detector is to said other side when the output of said signal detector exceeds a third predetermined threshold.

29. The apparatus of claim 27 wherein said second and third thresholds are adaptive thresholds derived from the level of the output from said reference detector.

30. The apparatus of claim 28 wherein said second and third thresholds are derived from signals which are predetermined fractions of the output from said reference detector.

31. A method for establishing the location of a reference point on a predetermined plane comprising the steps of:
   projecting an image having illuminated and unilluminated portions separated by a boundary representing said predetermined plane;
   detecting said image at two spaced points and providing two signals having amplitudes indicative of the intensity of said image at said two spaced points, one of said two spaced points residing in the illuminated portion of said image;
   moving the other of said two spaced points from one portion of said image to the other;
   deriving the ratio of the amplitude of the signal from said other point to the amplitude of the signal from said one point; and
   indicating when in the movement of said other point said ratio is within a predetermined range of a predetermined fraction, thereby to establish the location of said reference point on said predetermined plane.

32. The method of claim 31 wherein said predetermined fraction is ½.

33. A method for establishing the location of a reference point on a predetermined plane comprising:
projecting an image having illuminated and unilluminated portions separated by a boundary representing said predetermined plane;
detecting said image at two spaced points and providing two signals, each having a level indicative of the intensity of said image at a different one of said two spaced points; and
indicating when one of said two spaced points is in a position such that the level of the signal indicative of the intensity of the image at one point is within a range centered around a level which is a predetermined fraction of the level of the signal indicative of the intensity of said image at the other of said two spaced points.

34. The method of claim 33 wherein said fraction is ½.

35. Apparatus for establishing the location of a reference point on a predetermined plane comprising:
means for projecting an image, having illuminated and unilluminated portions separated by a boundary representing said predetermined plane;
means for detecting said image at two spaced points and for providing two signals each having a level indicative of the intensity of said image at a different one of said two spaced points; and
means for indicating when one of said two spaced points is in a position such that the level of the signal indicative of the intensity of the image at said one point is within a range centered around a level which is a predetermined fraction of the level of the signal indicative of the intensity of the image at the other of said two spaced points.

36. The apparatus of claim 35 wherein said fraction is ½.

37. A method of indicating when a signal detector is within a predetermined area within a boundary between illuminated and unilluminated portions of an image projected periodically at spaced time intervals comprising the steps of:
detecting the intensity of the radiation within the illuminated portion and generating a reference signal proportional thereto;
generating two additional signals each at a level corresponding to a different fraction of the level of said reference signal;
providing a signal from said signal detector proportional to radiation impinging thereon;
providing a first indication if the level of said reference signal exceeds a first threshold;
eliminating said first indication and providing a second indication if the level of the signal from said signal detector exceeds that of a first one of said additional signals; and
eliminating said second indication and providing a third indication if the level of the signal from said signal detector exceeds that of the second of said additional signals.

38. A method for locating a point in a predetermined region established by the image projected by a light source illuminating a reticle, said point lying on the boundary of the illuminated and unilluminated portions of said image comprising the steps of generating a first signal having an amplitude proportional to the intensity of the illuminated portion of said image,
generating a second signal having an amplitude proportional to the intensity of said image at points spanning said boundary; and
indicating when the amplitude of said second signal is within an amplitude range bounded by amplitudes which are two different predetermined fractions of the amplitude of said first signal.

39. The method of claim 38 wherein the limits of said range correspond to amplitudes lying equally above and below one half the amplitude of said first signal.

40. Apparatus for indicating when a signal detector is within a predetermined area within a boundary between illuminated and unilluminated portions of an image projected periodically at spaced time intervals comprising:
means for detecting the intensity of the radiation within the illuminated portion and generating a reference signal proportional thereto;
means for generating two additional signals each at a level corresponding to a different fraction of the level of said reference signal;
means for providing a signal from said signal detector proportional to radiation impinging thereon;
means for providing a first indication if the level of said reference signal exceeds a first threshold;
means for eliminating said first indication and providing a second indication if the level of the signal from said signal detector exceeds that of a first one of said additional signals; and
means for eliminating said second indication and providing a third indication if the level of the signal from said signal detector exceeds that of the second of said additional signals.

41. A method for locating a reference point in a predetermined region established by the image projected by a light source illuminating a reticle, said reference point lying on the boundary of the illuminated and unilluminated portions of said image comprising
detecting the intensity of said image at two detection points and generating signals having amplitudes corresponding to the intensity of the image at corresponding points and
establishing the position in space corresponding to the location of one of said detection points when a predetermined comparison between the amplitudes of said two signals exists.

42. Apparatus for establishing at a first location a plane having a predetermined orientation and position and for indicating a point on said plane at a second location comprising:
means for projecting an image having an illuminated and unilluminated portion separated by a straight boundary region representing the position and orientation of said plane; and
means for detecting said image at two spaced points for establishing the position of the center of said boundary region from the intensity of said image at said two spaced points and for indicating the position of said center, wherein said detecting means includes two light sensitive detectors, in spaced apart relationship, one of said detectors being a reference detector and the other of said detectors being a signal detector, wherein said establishing means includes means for dividing the output of said signal detector by the output of said reference detector, and wherein said indicating means includes means for indicating when the quotient at the output of said dividing means is within a predetermined range between 1 and 0.

43. The apparatus of claim 42, wherein said indicating means includes means for indicating when said quotient is 0.5± some predetermined error.

44. The apparatus of claim 43 wherein said dividing means includes means for establishing a pair of reference signals having amplitudes equal respectively to two different fractions of the amplitude of the signal from said reference detector, means for comparing the amplitude of the first of said reference signals with the amplitude of the output signal from said signal detector, and means for comparing the amplitude of the second of said reference signals with the amplitude of the output signal from said signal detector, a signal level from said signal detector lying between the amplitudes established by said reference signals indicating that said signal detector is positioned within a predetermined range of the center of said boundary region.

45. In a system for establishing at a first location a plane having a predetermined orientation and position and for indicating a point on said plane at a second location, said apparatus including means for projecting an image having an illuminated and unilluminated portion separated by a boundary region representing the position of said plane, two light sensitive detectors, in spaced apart relationship, one of said detectors being a reference detector and the other of said detectors being a signal detector, wherein said establishing means includes means for dividing the output of said other detector by said one detector, and wherein said indicating means includes means for indicating when the quotient at the output of said dividing means is within a predetermined limit of ½.

46. The apparatus of claim 45, wherein said indicating means includes means for indicating when said quotient is 0.5± some predetermined error.

47. The apparatus of claim 45 wherein said dividing means includes means for establishing a pair of reference signals equal respectively to two different fractions of the signal from said reference detector, means for comparing the first of said reference signals with the output signal from said signal detector, and means for comparing the second of said reference signals with the output of said signal detector, a signal level from said signal detector lying between said reference signals indicating that said signal detector is positioned within said predetermined portion of said boundary region.

48. Apparatus for establishing at a first location a plane having a predetermined orientation and for indicating a point in said plane at a second location comprising:
means at said first location for projecting an image having an illuminated and unilluminated portion separated by a boundary region of finite width, a portion of which lies in said plane;
means for detecting a predetermined location within said boundary region indicative of a point in said plane, including means for simultaneously detecting the intensity of radiation at two spaced points at said second location, means for maintaining one of said spaced points within said illuminated portion and means for moving the other of said spaced points across said boundary region; and
means for indicating when in the movement of said other spaced point the intensity of the boundary region at said other spaced point is a predetermined value with respect to the intensity at said one spaced point, whereby by proper choice of said predetermined value said other spaced point accurately marks the segment of the boundary region lying in said plane and therefore the position of a point on said plane at said second location.

49. The apparatus of claim 48 wherein said predetermined value is ½ ± Δ where Δ is the acceptable error, whereby said predetermined location is the center of said boundary region.

* * * * *